United States Patent [19]

Takakura et al.

[11] Patent Number: 5,099,111
[45] Date of Patent: Mar. 24, 1992

[54] OPTICAL CARD PROCESSING APPARATUS

[75] Inventors: Takeshi Takakura, Takatsuki; Yoshihito Koshiba, Nagaokakyo, both of Japan

[73] Assignee: Omron Corporation, Kyoto, Japan

[21] Appl. No.: 487,392

[22] Filed: Mar. 2, 1990

[30] Foreign Application Priority Data

Mar. 7, 1989 [JP] Japan .................................. 1-54640

[51] Int. Cl.$^5$ ............................................. G06K 13/00
[52] U.S. Cl. ................................. 235/475; 235/441; 235/486
[58] Field of Search ............... 235/441, 483, 486, 485, 235/475

[56] References Cited

U.S. PATENT DOCUMENTS 4,743,746  5/1988  Murschall ........................... 235/485

FOREIGN PATENT DOCUMENTS 904746   9/1986  Belgium .
0254328  1/1988  European Pat. Off. .
0296590 12/1988  European Pat. Off. .

Primary Examiner—Harold Pitts
Attorney, Agent, or Firm—Dickstein, Shapiro & Morin

[57] ABSTRACT

An optical card processing apparatus includes a holder feed mechanism (4) for reciprocating a card holder (2) holding an optical card (8), an optical head (5) for recording information on and/or reproducing information from the optical card held by the card holder, and a card holding mechanism provided on the card holder for pressingly holding at least three sides of the optical card. Deformation of the optical card can be corrected and vibration thereof suppressed by the card holding mechanism. As a result, focal-point error due to card curvature and vibration is reduced and optical cards can be fed at a higher speed.

11 Claims, 6 Drawing Sheets

OPTICAL CARD PROCESSING APPARATUS

BACKGROUND OF THE INVENTION

1. Field of the Invention

This invention relates to an optical card processing apparatus which uses a light beam to record information on and/or reproduce information from a card-shaped recording medium.

2. Description of Related Art

As shown in FIG. 7, a conventional optical card processing apparatus of this type includes a card holder 9 having a card holding section 90 on its top side, and a guide mechanism 91 on which the card holder 9 is reciprocatively mounted. The card holding section 90 is provided with strip-shaped card retaining plates 93 on both sides of the top of a card support plate 92, as shown in FIG. 8, and card insertion grooves 94 are formed between the card retaining plates 93 and the top side of the card support plate 92. When both side edges of an optical card 8 are inserted into the guide insertion grooves 94, these side edges of the optical card 8 are held in a pressed state to secure the card.

A reversibly rotatably drive motor 96 is connected to the card holder 9 via a belt 95. Situated above the card holder 9 is an optical head 97 for recording information on and/or reproducing information from the optical card 8. The optical head 97 has an objective lens (not shown) whose focusing is controlled in such a manner that an irradiating beam produced at recording/reproduction has its focal point formed on the surface of the information recording medium of the optical card 8 at all times. Accordingly, when the card holder 9 is reciprocated relative to the optical head 97 by the drive motor 96, recording information on and/or reproducing information from an information track of the optical card 8 is carried out while focusing control is performed in such a manner that a fluctuation in the distance between the card surface and the objective lens is made to approach zero. Such fluctuation is caused by deformation of the optical card 8 and vibration of the the same that occurs when the card holder is reciprocated.

FIG. 9 illustrates the entirety of the optical card 8 as well as a portion of the card shown in enlarged form. The optical card 8 undergoes a data reading (reproduction) or data writing (recording) operation performed by an optical processing apparatus. The optical card is not limited to that of the type which undergoes recording/reproduction optically but also covers optical cards of the type subjected to recording/reproducing electromagnetically. An information recording zone 80 of the optical card 8 is provided with a number of information recording tracks 81 defined by track guides 82. Bits representing information are recorded on these tracks 81 in the form of pits (in the case of a card capable of undergoing recording/reproduction optically). The track guides 82 are for the purpose of causing the recording/reproduction optical head to follow the tracks on the card (tracking control).

Since the card holder 9 is so arranged that the two longitudinal side edges of the four edges of the optical card 8 are held by the retaining plates 93, the front and rear edges of the optical card 8 are the free edges when the card is being held by the card holder 9. Consequently, in the event that the optical card sustains warping or curvature in such a manner that its four sides rise, as shown in FIG. 10a, or in such a manner that its front and rear side edges bow upwardly, as depicted in FIG. 10b recording/reproduction performance suffers. Specifically, the curvature cannot be corrected by the card holding section 90 and a large focal-point error is produced by such buckling at the time of recording/reproduction.

FIG. 8 illustrates the warped optical card 8 in a state held by the card holder 9. The state of the information recording zone 80 of the optical card 8 which appears between the retaining plates 93 is such that portions A, B near the front and rear edges of the card rise while the central portion C is recessed.

FIG. 11 illustrates conditions under which focal-point error is produced when reproducing recorded information from the optical card 8 wrapped as shown in FIG. 8. It will be appreciated that focal-point error fluctuates in dependence upon the deformation at the front and read edge portions A, B and the central portion C.

When the optical card 8 warped in this manner is conveyed back and forth, the degree of card vibration is great and therefore the focusing control mechanism within the optical head 97 cannot follow up the vibration. The result is a large focal-point error and poor recording/reproduction performance. In order to suppress the occurrence of this vibration, it is necessary to reduce the speed at which the card holder 9 is fed, but this makes it difficult raise the speed of the recording-/reproduction operation.

SUMMARY OF THE INVENTION

Accordingly, an object of the present invention is to provide an optical card processing apparatus wherein the manner in which an optical card is held by a card holder is specially contrived to correct optical card deformation and suppress the occurrence of vibration, whereby focal-point error attributed to curvature and vibration of the card is reduced and feed velocity raised to realize high-speed recording/reproduction.

According to the present invention, the foregoing object is attained by providing an optical card processing apparatus for performing at least one of recording information on and reproducing information from a rectangular optical card by reciprocating a card holder, which holds the optical card, relative to an optical head, characterized in that the card holder is provided with holding means for holding, in a pressed state, at least three sides of the optical card.

When the optical card is set in the card holder, at least three sides of the card are held in a pressed state. Therefore, even if the card is deformed such as by undergoing warping or curvature, the deformation is sufficiently corrected. Moreover, in comparison with the conventional arrangement in which two sides of the card are held, there are fewer free ends of the card that are capable of vibrating.

As a result, curvature of the optical card and card vibration ascribable to is free ends are reduced, thereby diminishing focal-point error at recording/reproduction to improve recording/reproduction performance. In addition, the feed velocity of the card holder can be raised to make possible high-speed recording/reproduction.

DESCRIPTION OF THE PREFERRED EMBODIMENT

Figure 1:
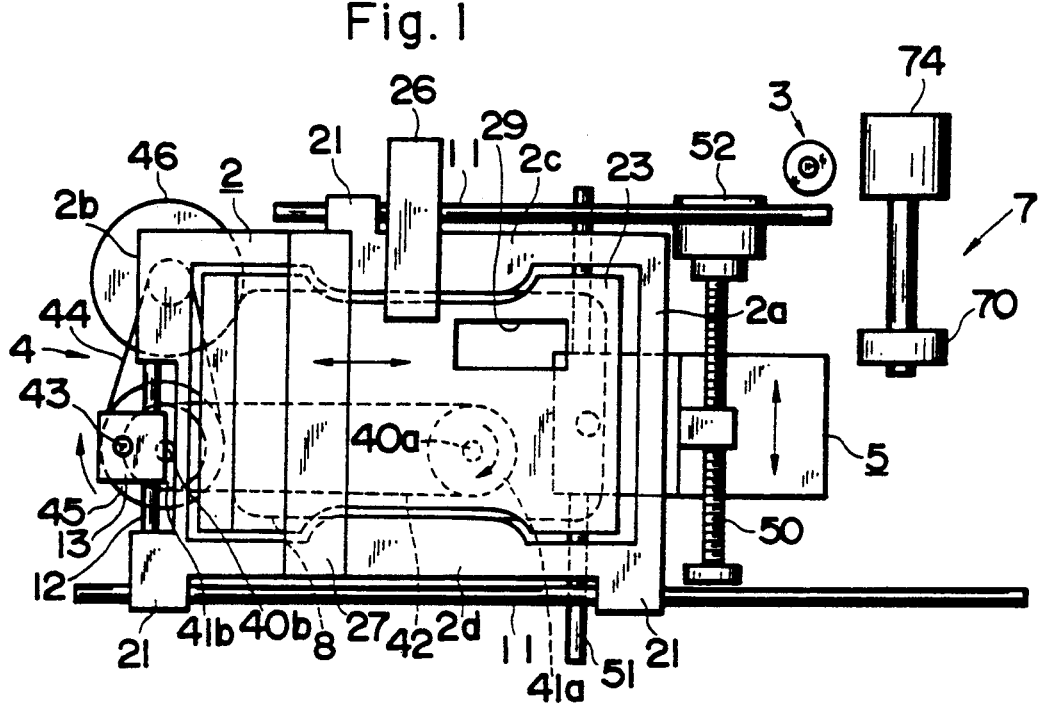
FIG. 1 is a plan view illustrating the internal mechanism of an optical card processing apparatus according to an apparatus of the present invention.
Figure 2:
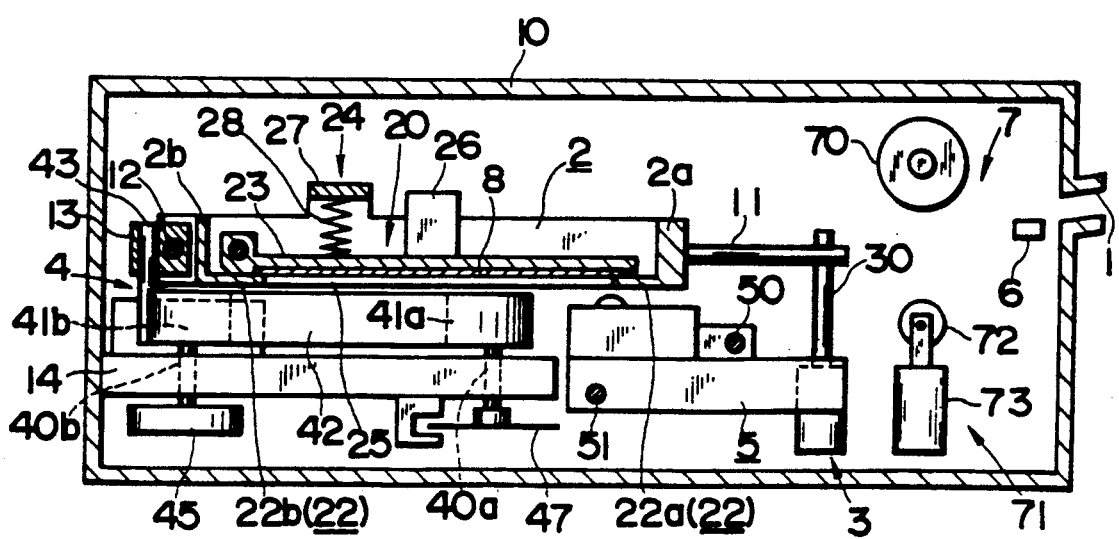
FIG. 2 is a sectional view longitudinally of the apparatus of FIG 1.
Figure 3:
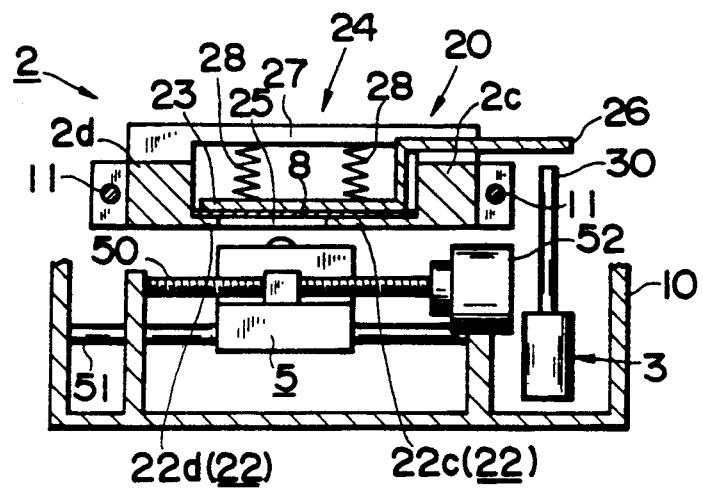
FIG. 3 is a sectional view transversely of the apparatus of FIG. 1.
Figure 4:
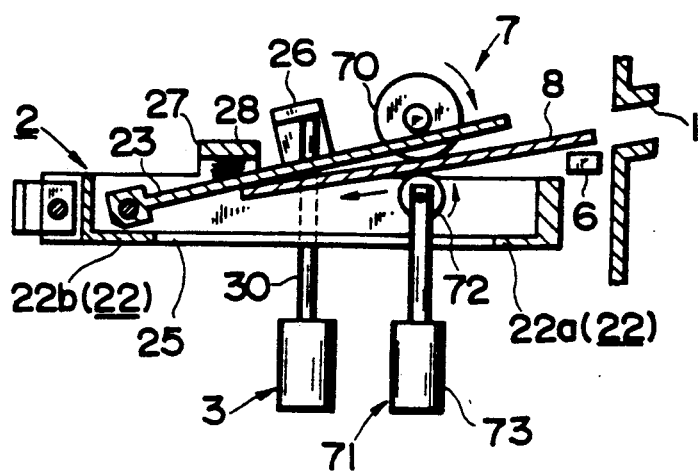
FIG. 4 is a sectional view of a card holder and illustrates an optical card in the process of being received by the card holder.

FIGS. 1 through 3 illustrate the internal mechanism of an optical card processing apparatus according to an embodiment of the present invention.

The optical card processing apparatus includes a case 10 having a card insertion slot 1, a pair of guide rods 11 arranged in parallel within the case 10 for reciprocatively supporting a card holder 2, an optical head 5 disposed below the holder traveling path on the side near the card inlet slot 1, and a holder feed mechanism 4 similarly disposed below the holder traveling path rearwardly of the optical head 5.

The guide rods 11 in the card holder 2 freely slidably support bearings 21 provided on both sides of the card holder 2, and the latter is further provided with a card holding mechanism 20 for holding, in a pressed state, the four sides of the rectangular card 8, namely the two longitudinal sides and the front and rear sides of the card.

The card holding mechanism 20 comprises a card support plate 22 constituting the bottom face of the card holder 2, a retaining plate 23 for pressing the optical card 8 against the card support plate 22, a pressurizing mechanism 24 for causing the retaining plate 23 to apply pressure to the card support plate 22, and a release mechanism 3 for urging the retaining plate 23 upward to release the optical card 8 from the held state.

The card support plate 22 is formed as a unitary body having a front wall 2a, rear wall 2b and longitudinal side walls 2c, 2d constituting the card holder 2, and the plate floor is formed to have a rectangular widow 25 in which the information recording zone 80 of the optical card 8 is situated. Accordingly, when the optical card 8 is set on the card support plate 22 with its information recording zone 80 facing downward, the two longitudinal sides of the optical card 8 are supported by two longitudinal side portions 22c, 22d of the card support plate 22, and the front and rear sides of the card are supported by front and rear end portions 22a, 22b of the card support plate 22.

The retaining plate 23 has a size corresponding to that of the optical card 8. One end of the retaining plate 23 is pivotally supported on the rear end portion 22b of the card support plate 22, and the other end of the retaining plate 23 is free to swing up and down. An arm member 26 projecting from one side of the retaining plate 23 to outside is attached to the retaining plate 23.

The pressuring mechanism 24 includes a mounting wall 27 spanning the two side walls 2c, 2d of the card holder 2, and two coil springs 28 disposed between the mounting wall 27 and the upper surface of the retaining plate 23 on both its longitudinal side portions.

The release mechanism 3 includes such components as a cam mechanism and solenoid, and is disposed on a side portion rearwardly of a card loading/ejecting mechanism 7, described later. The release mechanism 3 is equipped with a vertically operated actuating member 30. By elevating the actuating member 30, the arm member 26 of the retaining plate 23 is urged upwardly to tilt up the retaining plate 23. By lowering the actuating member 30, the upward urging force is eliminated and the retaining plate 23 is returned to the horizontal state.

The rear wall 2b of the card holder 2 is provided with a guide shaft 12 at right angles to the direction of holder movement. A slide member 13 is freely slidably disposed on the guide shaft 12 and is linked to the holder feed mechanism 4.

The holder feed mechanism 4 includes two vertical rotary shafts 40a, 40b freely rotatably provided on a fixed frame provided inside the case 10, pulleys 41a, 41b fixed to upper ends of the respective rotary shafts 40a, 40b, an endless belt 42 wound about the pulleys 41a, 41b, and a connecting pin 43 provided on the endless belt 42 at an appropriate location and freely rotatably connected to the slide member 13.

A pulley 45 is supported on the lower end of the rotary shaft 40b and is coupled via transmission means 44 such as a belt to an output shaft of a drive motor 46 which rotates in one direction. Attached to the lower end of the other rotary shaft 40a is an encoder 47 for detecting the amount of feed of the card holder 2.

The optical head 5 is supported on a lead screw 50 and a guide shaft 51 that are disposed orthogonal to the direction of travel of the card holder 2. The lead screw 50 is driven by a reversibly rotatable head feed motor 52. When the motor 52 is actuated, the optical head 5 is shifted by the guide shaft 51 and lead screw 50 in the direction perpendicular to the feed direction of the optical head 8, thereby accessing the information recording tracks 81.

Provided on the inner side of the card insertion slot 1 are a sensor 6 for sensing an introduced optical card 8, and the card loading/ejecting mechanism 7 actuated in response to a detection output from the sensor 6 to automatically transport the optical card 8 into and out of the card holding mechanism 20 of the card holder 2.

The card loading/ejecting mechanism 7 comprises a driving roller 70 disposed at a position above the holder travel path in the vicinity of the card insertion slot 1, and a loading auxiliary mechanism 71 disposed below the holder travel path at a position opposing the driving roller 70.

The loading auxiliary mechanism 71 comprises a driven roller 72 and a solenoid 73 for raising and lowering the driven roller 72 nd is so situated that when the driven roller 72 is raised it will pass through the rectangular window 25 in the card holder 2 and contact the driving roller 70.

The driving roller 70 is driven reversibly by a loading motor 74 so that the optical card 8 placed in the card insertion slot 1 is clamped between the roller 70 and the driven roller 72 to be introduced to the card holder 2 and then fed out to the card insertion slot 1 following processing.

In FIG. 1, numeral 29 denotes a hole formed in the retaining plate 23 in order that the driving roller 70 may project below the retaining plate 23. Numeral 25a in FIG. 6 denotes a cut-out, which communicates with the rectangular window 25, for allowing the driven roller 72 to project above the card support plate 22.

The operation of the card processing apparatus constructed as set forth above will now be described.

In a standby state prior to insertion of the optical card 8, the card holder 2 is situated in the vicinity of the card insertion slot 1 and the retaining plate 23 of the card holder 2 is in a state in which it is urged upwardly by the actuating member 30 of the release mechanism 3. Consequently, the card support plate 22 of the card holder 2 and the retaining plate 23 are spaced apart from each other, as a result of which the optical card 8 is capable of being received on the card support plate 22.

Figure 5:
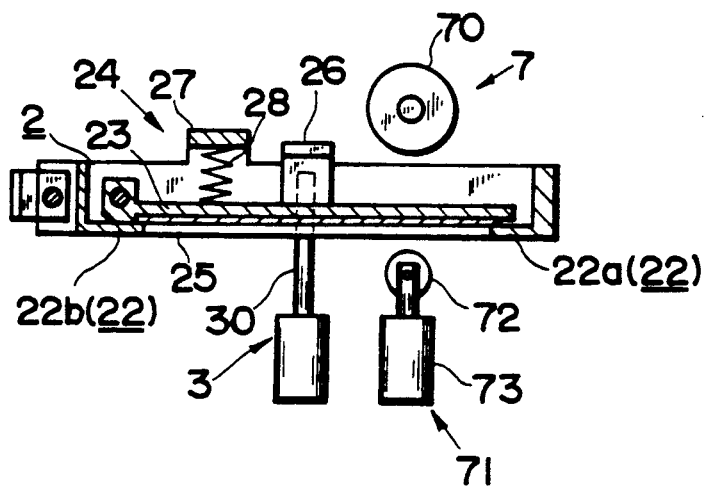
FIG. 5 is a sectional view of the card holder and illustrates the optical card in a state held by the card holder.

If the optical card 8 is now inserted from the card insertion slot 1 and sensed by the sensor 6, the loading motor 74 of the card loading/ejecting mechanism 7 begins operating and the driving roller 70 is rotated. In the standby state, the driven roller 72 of the loading auxiliary mechanism 71 is elevated to a position opposing the driving roller 70, so that the inserted optical card 8 is clamped between the driving roller 70 and driven roller 72 and introduced to the card holder 2. When the optical card 8 is conveyed n to a fixed position on the card support plate 22, the driven roller 72 of the loading auxiliary mechanism 71 is lowered, as shown in FIG. 5, after which the actuating member 30 of the release member 3 descends and the retaining plate 23 presses the optical card 8 against the card support plate 22 of the card holder 2 owing to the spring force of the coil spring 28 in the pressuring mechanism 24. The loading motor 74 is stopped to cease rotation of the driving roller 70.

Figure 6:
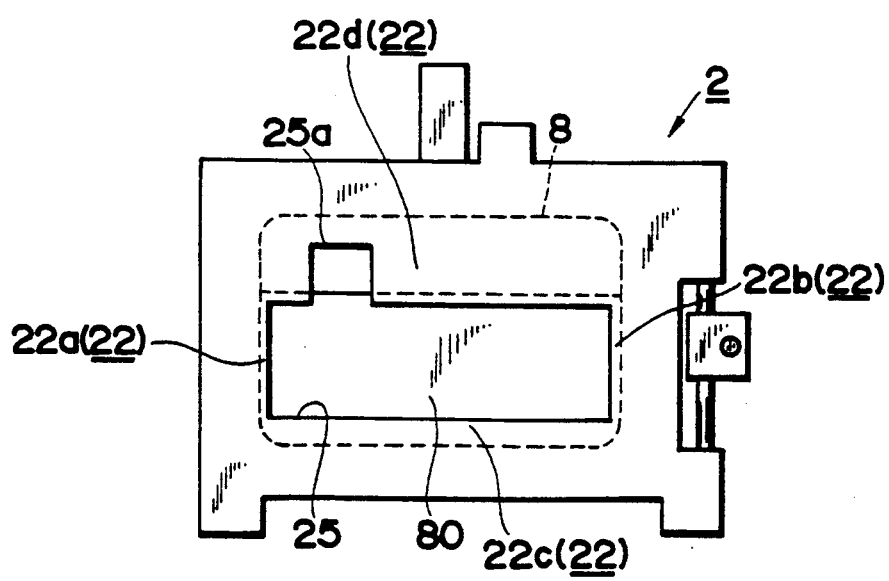
FIG. 6 is a bottom view of the card holder and illustrates the optical card in a state held by the card holder.
Figure 7:
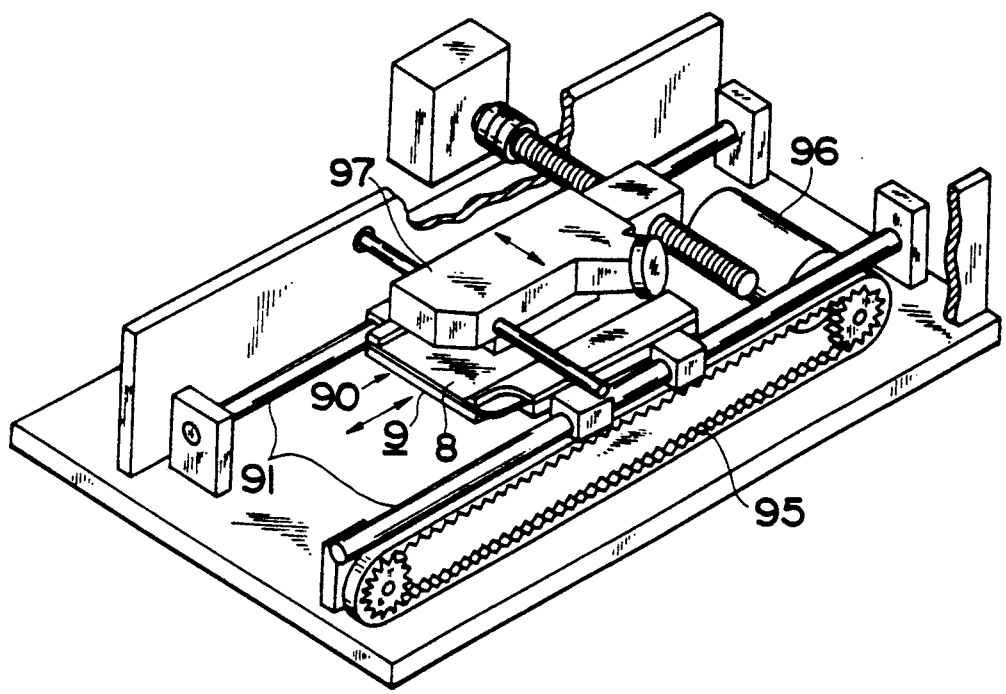
FIG. 7 is a perspective view showing an optical card processing apparatus according to the prior art.
Figure 8:
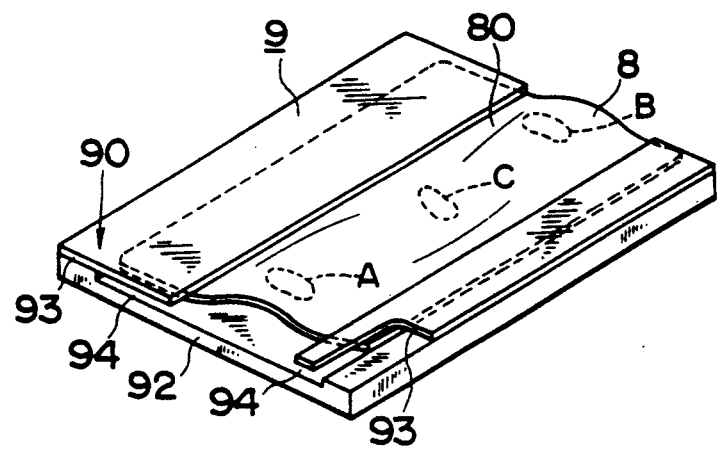
FIG. 8 is a perspective view of a prior-art card holder and shows a warped optical card in the held state.
Figure 9:
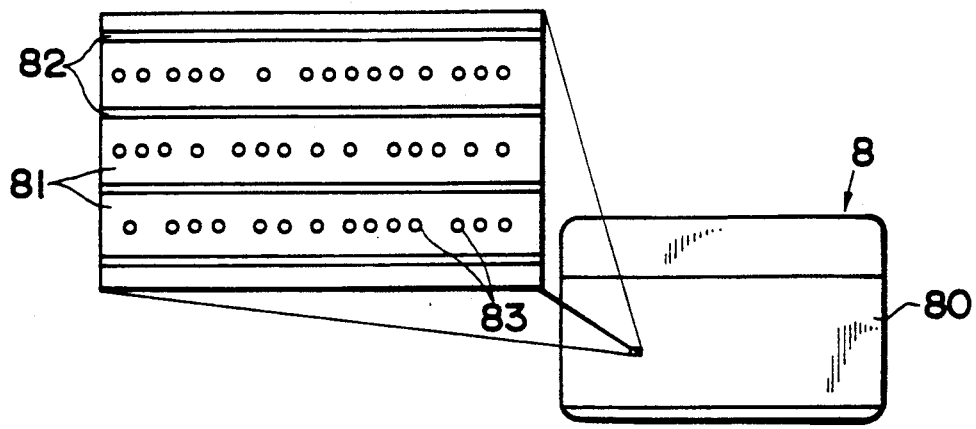
FIG. 9 is a plan view of an optical card and shows an information recording zone in enlarged form.
Figure 10A:
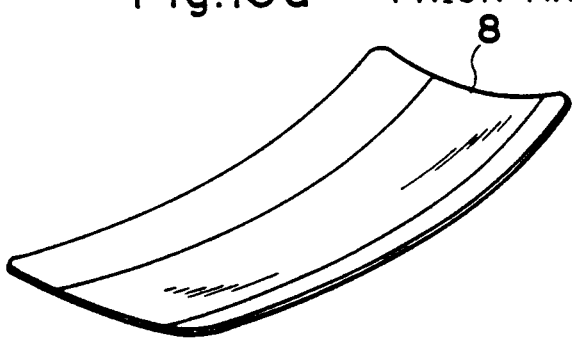
FIGS. 10a and 10b are perspective views showing an optical card which has undergone curvature.
Figure 10B:
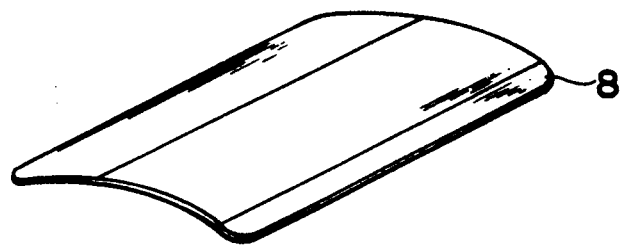
Figure 11:
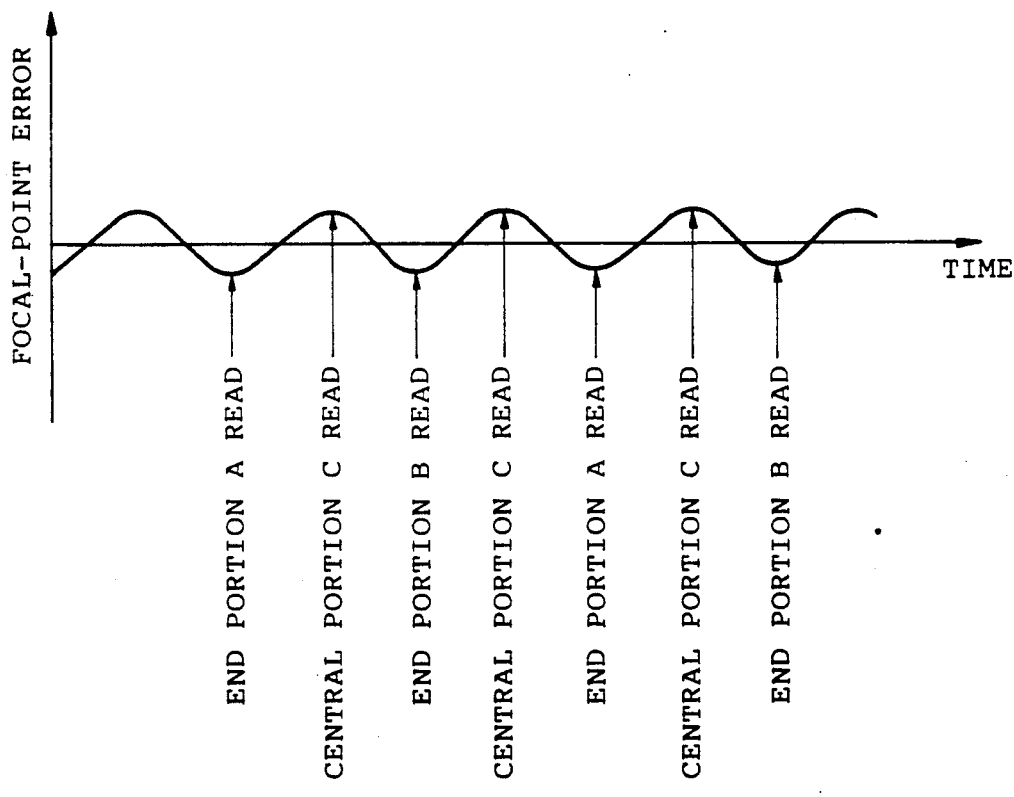
FIG. 11 is a graph showing a change in focal-point error with the passage of time when reproducing recorded information from the optical card of FIG. 8.

FIG. 6 illustrates the optical card 8 in a state held on the card support plate 22 by the retaining plate 23. The information recording zone 80 of the optical card 8 is situated opposite the position of the rectangular window 25, and the four sides of the optical card 8 are held clamped between the card support plate 22 and the retaining plate 23 while in intimate contact with the front end portion 22a, rear end portion 22b and both longitudinal side portions 22c, 22d of the card support plate 22. Accordingly, even if the optical card 8 undergoes curvature, such deformation is correctd by pressure applied by the coil spring 28. Since all four sides of the optical card 8 are held, there are no free ends to vibrate.

When the optical card 8 is held on the card holder 2, the holder feed mechanism 4 begins operating in conjunction with the card holder and the endless belt 42 is caused to travel by drive supplied by the motor 46. As a result, the connecting pin 43 on the endless belt 42 pulls the card holder 2 along the guide shafts 11 via the slide member 13 to shaft the card holder 2 in a first direction (from the side of the insertion slot toward the interior of the case 10).

When the connecting pin 43 reaches the outer periphery of the pulley 41b, the pin slides the slide member 13 in the width direction of the card holder 2 and the pulley 41b makes a half revolution to shift the slide member in a second direction opposite the first direction mentioned above (namely toward the insertion slot 1). Thereafter, through an operation similar to that involving the first direction, the connecting pin 43 shifts the guide holder 2 in the second direction along the guide shafts 11 via the slide member 13. Thus, the card holder 2 is reciprocated by continuous rotation of the drive motor 46 in one direction.

When the holder 2 is moved in the second direction, the optical head 5 moves relative to the information recording track 81 of the optical card 8 to record and/or reproduce information.

When the guide holder 2 beings to return to the initial position, the head feed motor 52 is actuated and the optical head 5 accesses the tracks on the optical card 8 while traveling along the guide shaft 51 and lead screw 50, after which the same card feeding operation is repeated.

Though the foregoing embodiment is so adapted that all four sides of the optical card 8 are held in a pressed state, an arrangement can be adopted in which three sides of the optical card 8 are held in a pressed state.

In the present embodiment, the optical card 8 is introduced and extracted by the loading/ejecting mechanism 7 while inclined with respect to the card holder 2. In other words, when the optical card 8 is introduced to the card holder 2 and when it is ejected from the card holder 2, the information recording zone 80 of the optical card 8 does not contact the front edge portion 22a and rear edge portion 22b (and of course, the two side portions 22c, 22d) of the card support plate 22. Accordingly, damage to the information recording zone 80 of the optical card 8 owing to contact between the zone and any mechanical member can be prevented before it occurs.

As many apparently widely different embodiments of the present invention can be made without departing from the spirit and scope thereof, it is to be understood that the invention is not limited to the specific embodiments thereof except as defined in the appended claims.

What is claimed is:

1. An optical card processing apparatus comprising:
   a holder feed mechanism for reciprocating a card holder for holding an optical card;
   an optical head for subjecting the optical card held by said card holder to at least one of an information recording operation and an information reproducing operation;
   a card holding mechanism, provided on said card holder, having a card support plate formed with a window at a position corresponding to an information recording zone of an optical card on said card holder, a retaining plate for pressing an optical card against said card support plate, and a pressurizing mechanism for providing a pressurizing force to said retaining plate in the direction of said card support plate to hold an optical card between said card support plate and said retaining plate;
   a release mechanism for moving said retaining plate in a direction away from said card support plate against said pressurizing force from said pressurizing mechanism to form a clearance between said card support plate and said retaining plate when said card holder is on a card insertion slot side, said clearing being larger than the thickness of the optical card; and an optical card loading/ejecting mechanism having at least two rollers for loading an inserted optical card into, and ejecting the loaded optical card from said clearance provided between said support plate and said retaining plate, the feeding and ejection of the optical card being performed obliquely with respect to said card holder along a plane different from the planes of said card support plate and said retaining plate.

2. The apparatus according to claim 1, wherein said card holding mechanism holds the optical card at at least three sides thereof.

3. A card processing apparatus, comprising:
   a holder feed mechanism for reciprocating a card holder holding an optical card;
   a card holding mechanism, provided on said card holder, comprising;
      a card support plate having two longitudinal side portions and two end portions for providing support to at least three sides of said card;
      a retaining plate for pressing the card against said card support plate; and
      a pressurizing mechanism for providing a pressurizing force to said retaining plate to hold said at least three sides of the card between said card support plate and said retaining plate in order that deformations of said card are corrected by the pressure applied by said pressurizing mechanism.

4. The card processing apparatus of claim 3, further comprising a read/write head for subjecting the card held by said card holder to at least one of an information recording operation and an information reproducing operation.

5. The card processing apparatus of claim 3, further comprising a release mechanism for moving said retaining plate in a direction away from said card support plate against said pressurizing force applied by said pressurizing mechanism.

6. The card processing apparatus of claim 3, further comprising a card loading/ejecting mechanism having at least two rollers for feeding an inserted card into and ejecting the card from said card holding mechanism.

7. The card processing apparatus of claim 6, wherein said loading/ejecting mechanism feeds and ejects said card obliquely with respect to said card holder along a plane that is different from the plane parallel to said card support plate.

8. A method for loading an optical card, comprising the steps of:
   sensing a card inserted into an insertion slot;
   elevating a loading/ejecting mechanism for feeding an inserted optical card into a card holder;
   separating a retaining plate from a card support plate in order to form a clearance between said retaining plate and card support plate; and
   loading said card obliquely with respect to said card holder along a plane which is inclined with respect to the planes of said card support and retaining plates in order that information recorded on said optical card does not have contact with and thus avoids damage by said card support plate and said retaining plate.

9. The method of claim 8, further comprising the step of pressing said retaining plate against said card support plate such that at least three sides of said optical card, which are supported by said card support plate are firmly supported in order that deformations of said optical card are corrected by the pressure applied by said retaining plate.

10. The method of claim 8, further comprising the step of recording information and reproducing information by means of an optical head on said inserted card.

11. The method of claim 8, further comprising the step of forming a clearance between the card support plate and the retaining plate when said card holder is on a card insertion slot side such that said clearance is larger than a thickness of said optical card.

* * * * *